J. HART & F. F. GREEN.
STOCK FEEDING DEVICE.
APPLICATION FILED OCT. 14, 1909.

967,517.

Patented Aug. 16, 1910.
4 SHEETS—SHEET 3.

WITNESSES:

INVENTORS
ATTORNEY.

J. HART & F. F. GREEN.
STOCK FEEDING DEVICE.
APPLICATION FILED OCT. 14, 1909.
967,517.
Patented Aug. 16, 1910.
4 SHEETS—SHEET 4.
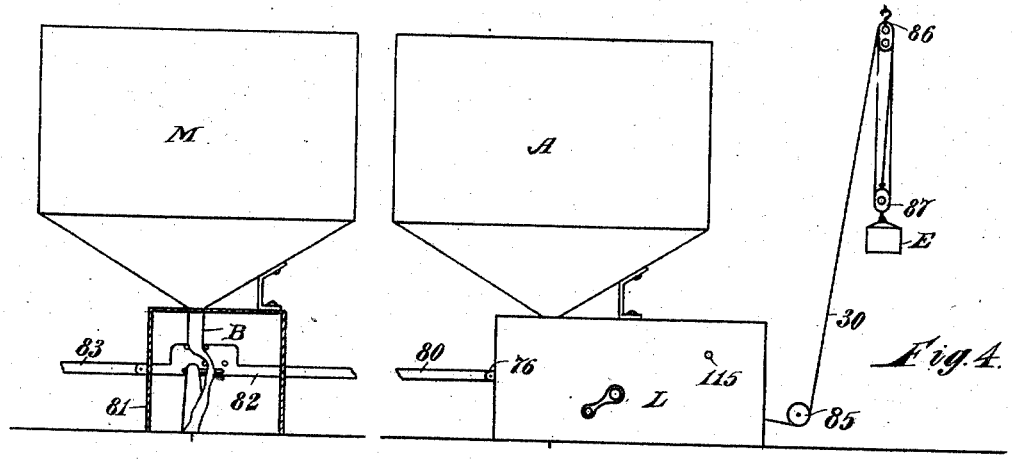
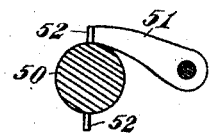
Fig. 5.
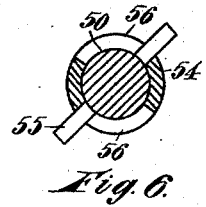
Fig. 6.
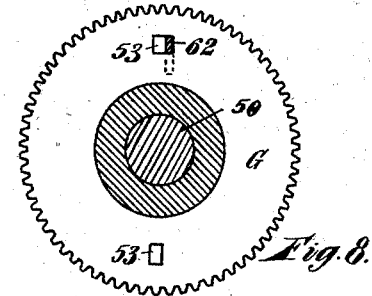
Fig. 8.
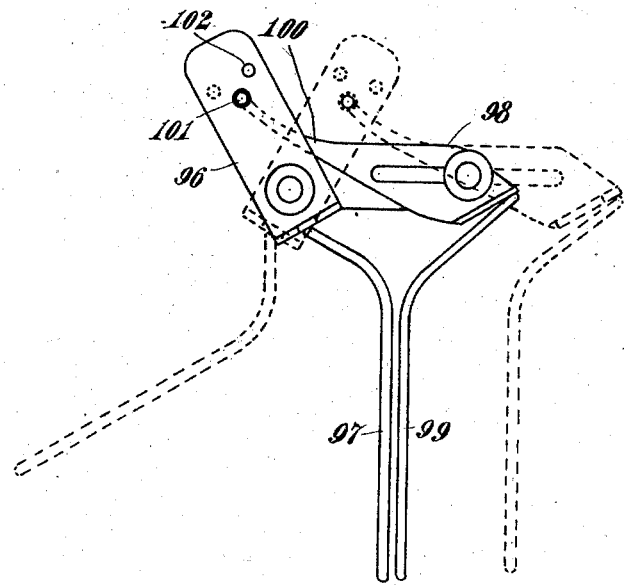
Fig. 7.
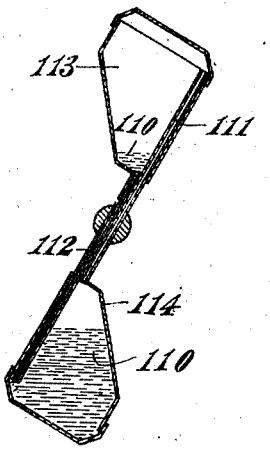
Fig. 9.
WITNESSES:
Ludger A. Nicol.
John Duckworth
INVENTORS
Justin Hart
Fred F. Green
BY
Gardner W. Pearson
ATTORNEY.

UNITED STATES PATENT OFFICE.

JUSTIN HART AND FRED F. GREEN, OF LAWRENCE, MASSACHUSETTS.

STOCK-FEEDING DEVICE.

967,517.

Specification of Letters Patent.  Patented Aug. 16, 1910.

Application filed October 14, 1909. Serial No. 522,611.

*To all whom it may concern:*

Be it known that we, JUSTIN HART and FRED F. GREEN, both citizens of the United States, and both residing at Lawrence, in the county of Essex and State of Massachusetts, have invented certain new and useful Improvements in Stock-Feeding Devices, of which the following is a specification.

Our invention relates to devices for automatically feeding domestic animals and birds, especially poultry.

We find that to get the best results in raising poultry, it is desirable to keep them exercised in getting their food. This is most readily done by keeping them busy scratching. Instead of feeding poultry from a trough or other vessel from which the grain or other food can be eaten rapidly, we find that it is better to cover the floor of the feeding pen with a litter of loose material such as hay, sawdust, etc., and to scatter thereon a small amount of grain from time to time. This forces the birds to hunt around and scratch for their food.
The machine of our invention is so constructed as to automatically scatter a small quantity of grain or other similar food at regular intervals.

Our device comprises a hopper which is filled with grain or other feed and which preferably tapers downward at the bottom thus directing the grain to a flexible conductor which further conducts the grain by gravity to a suitable spreader. If its course was unobstructed, the grain would rapidly run down through the conductor and would all be immediately scattered on the ground by the spreader. To prevent this, we normally choke this conductor, and open it by our machine for brief periods only. We may use one or more of these hoppers, conductors and spreaders and operate them from a single machine.

Our machine may be used to feed horses or cattle at regular intervals and in fact may be used to feed any kind of animals at regular times. Being operated by a weight, which may be as heavy as necessary, our machine has great power. The weight may be of metal of the usual form or it may be a bucket filled with sand, or other heavy material.

Figure 1:
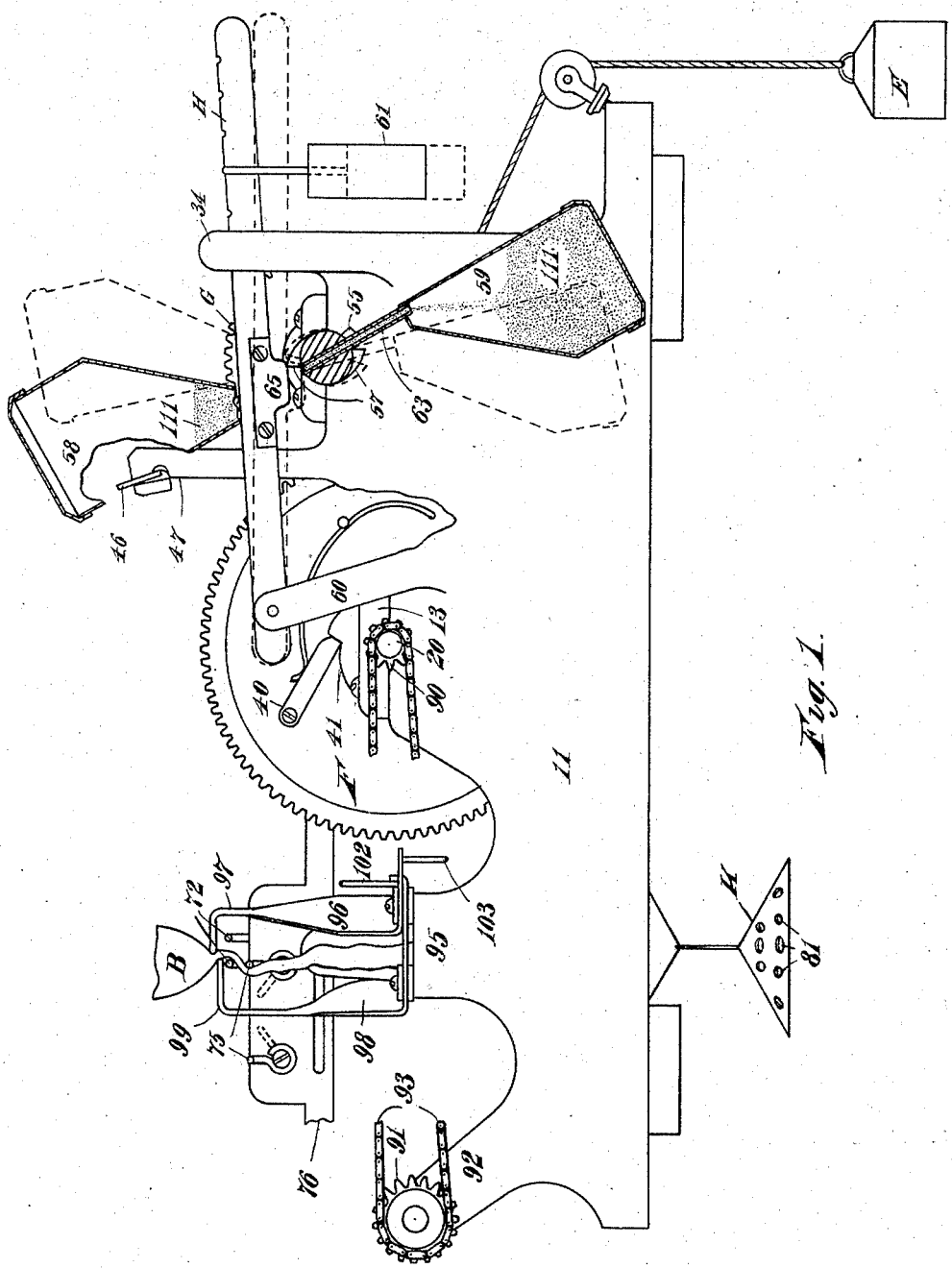
Figure 2:
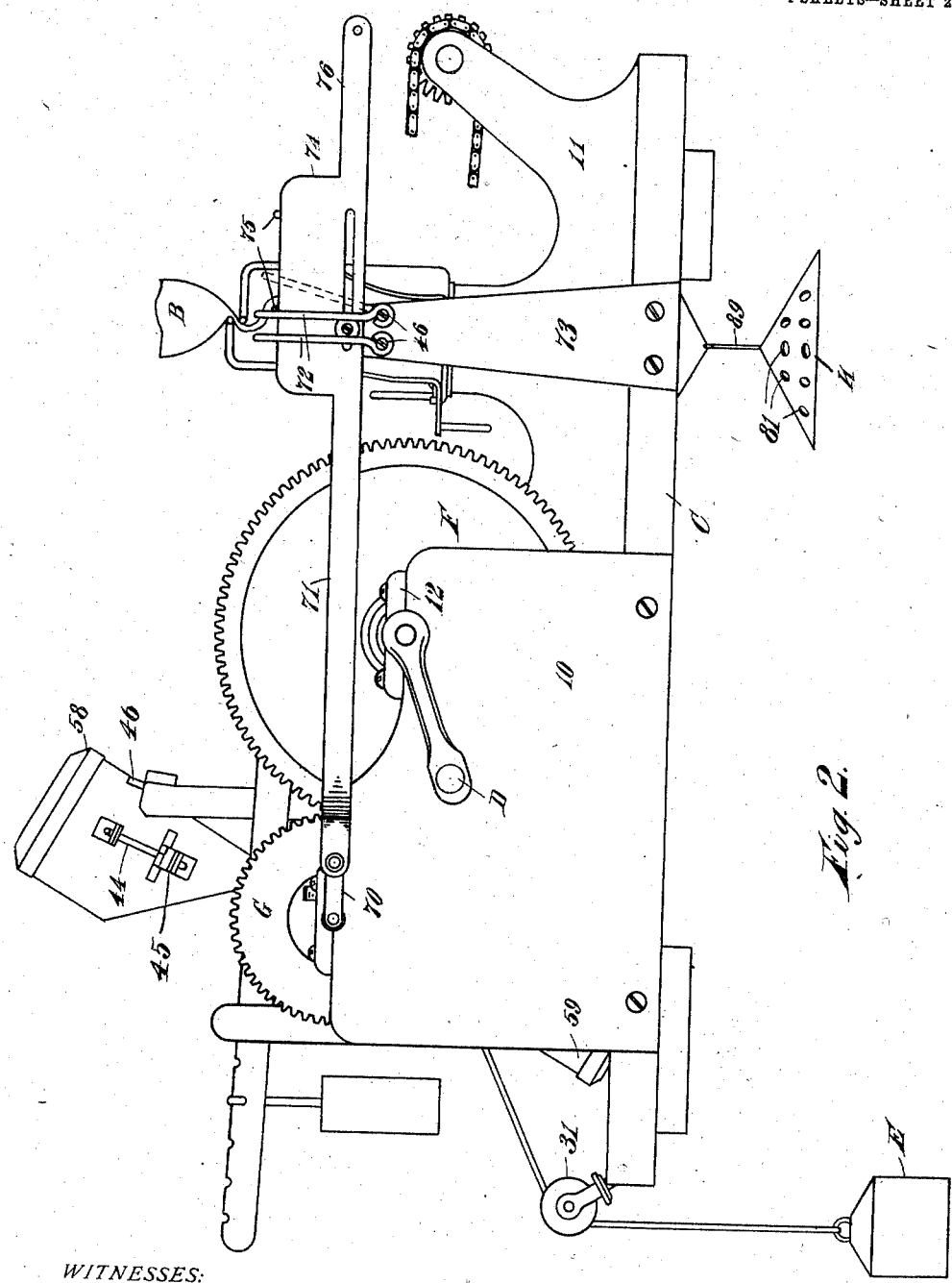
Figure 3:
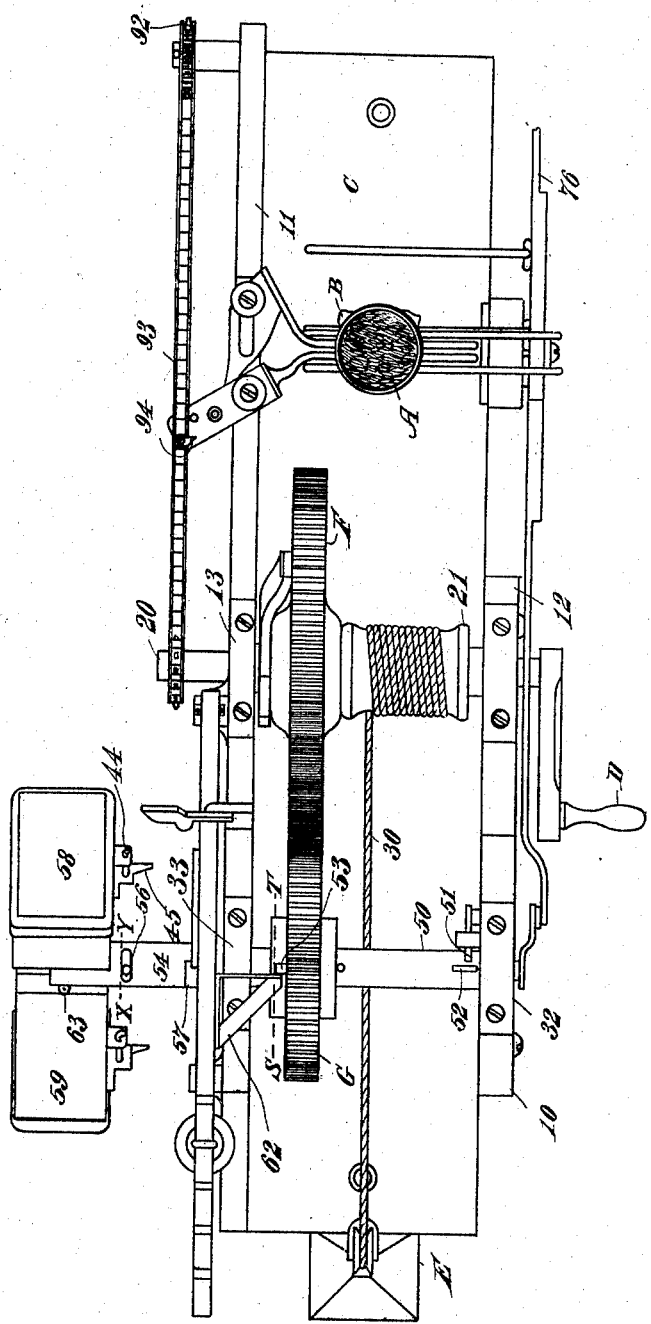

In the drawings, Figure 1 is a view from the front of a complete machine with a single hopper. Fig. 2 is a view from the back and Fig. 3 is a view from the top. Fig. 4 is a view of a plurality of hoppers operated by one of our machines. Fig. 5 is a detail of our gravity pawl. Fig. 6 is a section on line X—Y of Fig. 3. Fig. 7 is a top view of our intermittent choker. Fig. 8 is a section on line S—T of Fig. 3. Fig. 9 shows our reversible containers adapted for the use of liquid instead of sand.

C represents the base of our machine which may rest on any suitable support. Attached to base C and rising on each side thereof are the sides 10 and 11. Base C and one side 11 may be made of metal and cast in one piece.

Revoluble in suitable bearings 12 and 13 near the top of sides 10 and 11 is a main shaft 20 which carries at one end a winding crank D. Shaft 20 also carries between the sides 10 and 11, a spool 21 to which is attached and upon which is wound the weight cord 30. This weight cord 30 passes over a pulley wheel 31 attached to the end of base plate C. It carries attached to its end, the driving weight E. This weight supplies the motive power for the whole machine and should be quite heavy. The machine should be either so placed on a raised platform or there should be sufficient space below the weight so that cord 30 may be of sufficient length to keep the device in operation a considerable period.

As shown in Fig. 4, the cord 30 may run under a pulley 85, thence up and over a double pulley 86 fastened to the ceiling or other high place, thence down under pulley 87 to which is fastened weight E thence back to and over double pulley 86 and back to pulley 87 in a well known manner. Main shaft 20 also carries a ratchet 41, between which and spool 21, we locate main gear F which is free to revolve on shaft 20 except for pawl 40. This pawl 40 is carried on the side of gear F and is spring pressed to engage ratchet 41. Thereby cord 30 may be wound on spool 21 by means of crank D without revolving gear F. As cord 30 is unwound, pawl 40 and gear F are revolved.

Revolubly carried in bearings 32 and 33 supported by sides 10 and 11, is a shaft 50 which we will call the escapement shaft. Stops 52 on this shaft and a gravity pawl 51 pivoted on side 10 prevent this shaft from turning except in one direction. This pawl 51 assists pawl 40 to prevent gears F and G from reversing. Shaft 50 carries escapement gear G which engages main gear F. On one side, gear G carries two oppositely disposed studs 53.

Pivoted to a suitable arm or extension 60 of side 11 is a trip lever H. Trip weight 61 which may be adjustable thereon, normally tends to depress lever H. Preferably lever H is guided by a fork 34 which projects upwardly from side 11.

From the inside of lever H, we extend an arm 62 in such a position that it will be in front of whichever stud 53 happens to be at the top when lever H is somewhat raised as shown in Fig. 8. We inclose the end of shaft 50 adjoining lever H, in a sleeve 54 which fits it with a running fit. In this sleeve are two slots 56 and through these slots and shaft 50 is passed a pin 55. See Fig. 6. At its side and extending downward, lever H carries a tooth 65. Directly under this tooth, 65, sleeve 54 carries two cams 57. Each of these cams extends around a little less than one-half of the circumference of sleeve 54 and rises regularly to a point near its end and then merges into a curve whose center is the center of sleeve 54. At this end, each cam drops directly down to sleeve 54. Sleeve 54 also carries transversely at its outer end, a tube 63 which carries at its ends and connects the sand receptacles 58 and 59. One of these receptacles is filled with sand or other easy running material or it may be filled with liquid as shown hereafter.

The main bodies of receptacles 58 and 59 are located on opposite sides of tube 63. On that account, as the sand 111 in the upper receptacle slowly travels through tube 63 into the lower receptacle, the tendency is to carry the lower receptacle downward and backward from the position shown in the full lines in Fig. 1 to the position shown in the dotted lines. The parts are so adjusted that by raising the full receptacle to the position shown in the full lines in Fig. 1, one cam 57 will hold up tooth 65 and lever H so that arm 62 will be in front of one of the studs 53 and will thereby prevent weight E from further revolving the parts. As the sand slowly travels into the lower receptacle however, it carries sleeve 54 forward with a loose motion from pin 55 through the length of slots 56 until a cam 57 is moved from under tooth 65 which drops off the end thereof. Lever H drops with tooth 65 and arm 62 drops also from in front of a stud 53 to the position shown in the dotted lines in Fig. 8. This allows weight E to revolve gears F and G. This action transmitted to pin 55 moves it forward to the end of slot 56 and revolves sleeve 54 until it lifts the filled sand receptacle to the position shown in the full lines in Fig. 1. The revolving of sleeve 54, through cam 57, raises tooth 65, lever H and arm 62 again in front of a stud 53 thereby stopping the parts in the desired position. The same action will be repeated every time the top sand receptacle empties sufficiently, until the weight E has run down. To prevent receptacles 58 and 59 from spinning around, we place on the inside of each, a rail 44 on which slides a nose 45 in such a position that it will be thrown outward by centrifugal force and will strike a stop 46 carried by a suitable arm 47 projecting above side 11. The nose 45 will be thrown outward as the lower receptacle swings up and will strike stop 46 thus stopping the receptacle. It will then by gravity drop down out of the way.

The time it takes for the sand to flow from one receptacle to the other determines the time of each half rotation of shaft 50. Upon the end of shaft 50 is a crank 70 which is so placed that it will be normally horizontal except while the receptacles 58 and 59 are changing positions. A connecting rod 71 connects escapement crank 70 with a slide 74. This slide 74 runs in suitable guides and carries the shut off wires 75. To standard 73 which rises from the base, we attach the right angularly bent stationary shut off wires 72. These are formed with loops at the attaching end, through which we pass screws 46 by which the distance between the wires may be adjusted. Wires 75 are similarly attached to slide 74 and may be likewise adjusted. Wires 75 are so arranged as to slide under and beyond wires 72 at each half revolution of crank 70.

We provide a hopper A with a tapering bottom to which is attached a flexible conductor B which passes downward between wires 72 and wires 75 and empties upon the conical spreader K suspended from its apex by a wire 89 and preferably formed with holes 81. It will be readily seen that as crank 70 makes a half revolution, thereby sliding wires 72 under wires 75, there will be a moment when conductor B will be open and unobstructed thus allowing a definite quantity of grain to pass through and to fall upon spreader K by which it is scattered. This spreader K preferably is merely a shell of sheet metal with a plurality of holes through it.

Where it is desirable to operate more than one hopper with its accompanying flexible conductor and spreader, we use at the extreme end of slide 74, a lug 76 to which we attach a connecting rod 80 which may be of any length. Our machine may thus be located in or near one pen and another hopper may be connected in a distant pen. Our machine is preferably cased or placed in a suitable box L which supports hopper A. Another hopper M, as shown in Fig. 4, may be located at a distance and may be supported upon a suitable box 81 which incloses and guides a slide 82 attached to rod 80. Slide 82 carries shut off wires similar to 75 which coöperate with stationary wires attached to box 81 in the same manner that wires 72 are attached to support 73. A conductor B passes between these wires from the mouth of hopper M and delivers the grain to a spreader K. A third hopper may be connected to the system by a connecting rod 83 and the number of hoppers thus connected may be as great as desired.

It is sometimes desirable to shut off the feed during certain regular periods to give the birds or animals a rest. We accomplish this result by providing a sprocket 90 carried by the end of shaft 20 and a loose sprocket 91 revoluble on an arm 92 extended from base C. Between these sprockets runs the chain 93 which carries a finger 94 projecting inward. At the top of a suitable support 95 from base C, we pivot the rocking member 96. This member 96 carries a shut off wire 97 on one side of conductor B and is pivotedly connected to sliding member 98 which carries a similar wire 99 on the other side of conductor B. The tail 100 from sliding member 98 is pivoted at 101 to member 96. It will be readily seen that by pivotally moving member 96 toward member 98, from the position shown in the full lines in Fig. 7 to the position shown in the dotted lines, such movement will move the member 98 away from member 96 and widely separate choking wires 97 and 99 as shown by the dotted lines. By pivotally swinging member 96 in the opposite direction, wires 97 and 99 are brought together. We locate a pin 102 extending upward and a pin 103 extending downward from member 96 in the path of finger 94. It will be readily seen that as finger 94 travels along, it will carry with it pin 102 as it passes above thereby opening wires 97 and 99, and as it travels back underneath it will carry with it pin 103 and will thus close the wires 97 and 99. As main gear F advances only about ¼ of a revolution with each shift of the sand containers, chain 93 advances but a very small distance and will take a considerable time to make a half circuit. The longer this chain, the longer is the interval. Increasing the size of main gear F also increases the interval.

Where our machine is used for feeding stock other than poultry, the shut off wires 72 and 75 may be moved back out of the way or rod 71 may be disconnected from crank 70. When this is done, we place in the hopper, as much food as it is desired to drop and close choking members and wires 97 and 99. By lifting pawl 40, chain 93 may be moved to any such position that will give finger 94 the desired distance to travel before it operates pin 102 to open wires 97 and 99. This distance which finger 94 must travel determines the period at the end of which it is desired to open conductor B and deliver the feed. When so used, very nearly the whole force of weight E is transmitted to finger 94, which makes our machine very powerful.

In Fig. 9, we show a construction for the sand containers where instead of sand, we use a liquid 110. In this case, we use two tubes 111 and 112. Tube 111 runs from the outer end of receptacle 113 to the inner end of receptacle 114 and tube 112 runs from the inner end of receptacle 113 to the outer end of receptacle 114. By this construction, the air is permitted to escape from the lower to the upper receptacle and the liquid is permitted to flow from the upper to the lower receptacle.

We prefer to pass a stopping pin 115 through the side of box L in such position that lever H will rest upon it when raised. By pushing in this pin, lever H cannot drop and the parts will be held from moving. When this pin is pulled out, the parts will resume their action.

What we claim as our invention and desire to cover by Letters Patent is:—

1. In a stock feeding device, the combination of a hopper, a passage therefrom, and means for opening and closing said passage, with a driving weight, gearing operative thereby, a shaft revoluble by said gearing, oppositely disposed receptacles connected and carried by a tube extended radially through said shaft, and studs on said gearing in engagement with an arm operated by said receptacles as described.

2. In a timing machine, a driving weight, gearing revoluble thereby, an escapement shaft operated by said gearing, a sleeve in which are slots loosely carried by the escapement shaft, a loose motion pin passed through said escapement shaft in engagement with the slots, a connecting tube which passes radially through said sleeve, sand receptacles carried at each end of said tube, cams carried by said sleeve, a trip lever which has a tooth in engagement with said cams, a weight carried by said lever, an arm carried by the lever, and studs carried by said gearing in engagement with said arm.

3. In a timing machine, a driving weight, a cord connected thereto, a main shaft driven by said cord, a main gear driven by the shaft, an escapement shaft, an escapement gear carried by the escapement shaft in engagement with the main gear, studs oppositely disposed thereon, a lever, an arm extended therefrom in the path of said studs, a tooth depending from said lever, a sleeve carried by the escapement shaft, cams carried thereby, in operative relation with said tooth, and receptacles carried on opposite ends of a tube which is radially carried by said sleeve.

4. In a timing machine a driving weight, a cord connected thereto, a main shaft driven by said cord, a main gear driven by the shaft, an escapement shaft, an escapement gear carried by the escapement shaft in engagement with the main gear, studs oppositely disposed thereon, a trip lever, an arm extended therefrom in the path of said studs, a tooth depending from said lever, a sleeve carried by the escapement shaft, cams carried thereby in operative relation with said tooth, and receptacles carried on opposite ends of a tube which is radially carried by said sleeve, rails carried by the receptacles, noses slidable thereon, and a stop at the outer limit of the path of said noses.

5. In a machine of the class described, a driving weight, a cord connected thereto, a main shaft driven by said cord, a main gear driven by the shaft, an escapement shaft, an escapement gear carried by the escapement shaft in engagement with the main gear, studs oppositely disposed thereon, a lever, an arm extended therefrom in the path of said studs, a tooth depending from said lever, a sleeve carried by the escapement shaft, cams carried thereby in operative relation with said tooth, and receptacles carried on opposite ends of a tube which is radially carried by said sleeve, rails carried by the receptacles, noses slidable thereon, and a stop at the outer limit of the path of said noses, combined with a hopper, a flexible conductor depending therefrom, stationary wires on each side thereof, a crank carried by the escapement shaft, a connecting rod and slide operative thereby, and slide wires carried by said slide as described.

6. In a timing machine a driving weight, a cord connected thereto, a main shaft driven by said cord, a main gear driven by the main shaft, an escapement shaft, an escapement gear carried by the escapement shaft in engagement with the main gear, studs oppositely disposed thereon, a lever, an arm extended therefrom in the path of said studs, a tooth depending from said lever, a sleeve carried by the escapement shaft, cams carried thereby in operative relation with said tooth, and receptacles carried on opposite ends of a tube which is radially carried by said sleeve together with a winding crank and pawls adapted for winding the mechanism.

7. In a machine of the class described, a driving weight, a cord connected thereto, a main shaft driven by said cord, a main gear driven by the shaft, an escapement shaft, an escapement gear carried by the escapement shaft in engagement with the main gear, studs oppositely disposed thereon, a lever, an arm extended therefrom in the path of said studs, a tooth depending from said lever, a sleeve carried by the escapement shaft, cams carried thereby in operative relation with said tooth, and receptacles carried on opposite ends of a tube which is radially carried by said sleeve, rails carried by the receptacles, noses slidable thereon, and a stop at the outer limit of the path of said noses, combined with a hopper, a flexible conductor depending therefrom, stationary wires on each side thereof, a crank carried by the escapement shaft, a connecting rod and slide operative thereby, and slide wires carried by said slide, a sprocket carried by the main shaft, a loose sprocket, an endless chain between them, a finger carried thereby, a pivoted member, a closing wire carried thereby, upper and lower pins in operative relation with said tooth, a slidable member pivoted to the pivoted member, and a wire carried by the slidable member as described.

8. In a stock feeding machine, a driving weight, a cord attached thereto, a main shaft driven by said cord, a main gear driven by the shaft, an escapement shaft, an escapement gear carried by the escapement shaft in engagement with the main gear, studs oppositely disposed thereon, a trip lever, an arm extended therefrom in the path of said studs, a tooth depending from said lever, a sleeve loosely carried by the escapement shaft, slots therein, a loose motion pin which passes through the escapement shaft and the slots, cams carried by said sleeve in operative relation with said tooth, a connecting tube which passes radially through the sleeve, sand receptacles carried at each end of the tube, rails carried by the receptacles, noses slidable thereon, and a stop at the outer limit of the path of said noses, combined with a sprocket carried by the main shaft, a loose sprocket, an endless chain between them, a finger carried thereby, a food receptacle, and means for opening the outlet from said receptacle operative by said finger as described.

9. In a timing machine, a main shaft, means for driving said main shaft, a main gear driven by the main shaft, an escapement shaft, an escapement gear carried by the escapement shaft in engagement with the main gear, studs oppositely disposed thereon, a trip lever, an arm extended therefrom in the path of said studs, a tooth depending from said lever, a sleeve loosely carried by the escapement shaft, slots therein, a loose motion pin which passes through the escapement shaft and the slots, cams carried by said sleeve in operative relation with said tooth, a connecting tube which passes radially through the sleeve, sand receptacles carried at each end of the tube, rails carried by the receptacles, noses slidable thereon, and a stop at the outer limit of the path of said noses, combined with a sprocket carried by the main shaft, a loose sprocket, an endless chain between them, and a finger carried thereby.

10. In a poultry feeding device, the combination of a grain hopper, a flexible conductor which depends therefrom, and elastic choking wires on each side of said conductor, with means for operating said wires at pre-determined intervals.

11. In a poultry feeding device, the combination of a hopper, a flexible conductor depending therefrom, and stationary wires on each side of the conductor, with a timing device, a slide operative thereby and slide wires carried by said slide in operative relation with the stationary wires.

In testimony whereof we hereto affix our signatures in presence of witnesses.

JUSTIN HART.
FRED F. GREEN.

Witnesses to Hart:
WALTER A. BATEMAN,
JAMES A. LORD.

Witnesses to Green:
JAMES A. LORD,
GARDNER W. PEARSON.